(12) United States Patent
Kasurinen

(10) Patent No.: US 6,317,475 B1  
(45) Date of Patent: Nov. 13, 2001

(54) SYNCHRONIZATION OF TELECOMMUNICATIONS NETWORK

(75) Inventor: Timo Kasurinen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/359,085

(22) Filed: Jul. 22, 1999

Related U.S. Application Data

(63) Continuation of application No. PCT/FI98/00100, filed on Feb. 3, 1998.

(30) Foreign Application Priority Data

Feb. 11, 1997 (FI) ........................................................ 970576

(51) Int. Cl.⁷ ...................................................... H04L 7/00
(52) U.S. Cl. ............................ 375/356; 370/503; 370/509
(58) Field of Search .................................. 375/354, 356; 370/503, 507, 514, 516, 518

(56) References Cited

U.S. PATENT DOCUMENTS

| | | |
|---|---|---|
| 2,986,723 | 5/1961 | Darwin et al. . |
| 4,142,069 | 2/1979 | Stover . |
| 4,837,850 | 6/1989 | Maisel et al. . |
| 4,939,752 * | 7/1990 | Literati et al. ........................ 375/107 |
| 5,475,717 | 12/1995 | Cordonnier et al. . |
| 5,784,421 * | 7/1998 | Dolev et al. ........................... 375/354 |
| 5,886,996 * | 3/1999 | Wolf ...................................... 370/507 |
| 5,901,136 * | 5/1999 | Lovelace et al. ..................... 370/217 |
| 5,955,959 * | 9/1999 | Taki et al. ........................ 340/825.14 |

FOREIGN PATENT DOCUMENTS

| | | |
|---|---|---|
| 0 450 828 | 10/1991 | (EP) . |
| 2 301 991 | 12/1996 | (GB) . |
| 10-136000 | 5/1998 | (JP) . |
| WO 94/11962 | 5/1994 | (WO) . |
| WO 94/11966 | 5/1994 | (WO) . |
| 0 723 344 | 7/1996 | (WO) . |
| WO 97/33396 | 9/1997 | (WO) . |

\* cited by examiner

Primary Examiner—Stephen Chin  
Assistant Examiner—Dac V. Ha  
(74) Attorney, Agent, or Firm—Altera Law Group, LLC

(57) ABSTRACT

The invention relates to a method for creating a synchronization network in a telecommunications network, comprising several nodes (D . . . M) interconnected with links and sending synchronization status messages indicating the quality level of the corresponding signal relative to the synchronization. At least one master clock (PRC) is used as a synchronization source for the network nodes, and the synchronization network is established by selecting, in accordance with a topology defined by the links, synchronization chains formed by successive nodes, through which chains the signal of at least said main clock is distributed to the nodes in the chain, and by defining for the different nodes in the chain a node-specific priority list including node interfaces at different priority levels, determining the synchronization source to be selected by the node when signals of equal quality levels are received on the node connections. In order that the synchronization may be implemented as faultlessly as possible in complex networks, a basic synchronization network is first established from the best synchronization chains between two different master clocks. Thereafter synchronization chains leading from other nodes to said synchronization network are included in said synchronization network by selecting the chains in an order of superiority in accordance with predetermined criteria.

9 Claims, 6 Drawing Sheets

SYNCHRONIZATION OF TELECOMMUNICATIONS NETWORK

This application is a continuation of international application number PCT/FI98/00100, filed Feb. 3, 1998, pending.

FIELD OF THE INVENTION

The invention relates generally to synchronization of telecommunications networks, and particularly to a method for determining the synchronization hierarchy in networks in which nodes send synchronization status messages to one another. A synchronization status message indicates the signal quality level relative to the synchronization, and thus the node can decide on the basis of the quality levels received which signal it is to use as its synchronization source. Hence, it is ensured by means of synchronization status messages that the node utilizes the best possible signal as its synchronization source. The method of the invention is intended particularly for the synchronization of SDH (Synchronous Digital Hierarchy) devices, but it can also be used in conjunction with conventional PDH (Plesiochronous Digital Hierarchy) devices.

BACKGROUND OF THE INVENTION

In this description, the term node (or node equipment) is employed for the intersection point of links in a telecommunications network. A node may be any device or equipment, for example a branching device or a cross-connection device.

In present-day (plesiochronous) telecommunications systems, synchronization may be performed either by means of separate synchronization connections or by utilizing the normal data connections between the system nodes. Separate synchronization connections are used only in isolated cases and very seldom to synchronize an entire network. When data links are used for the synchronization, the line code must be such that the nodes are also capable of recognizing the clock frequency from the incoming data signal. Synchronization of the network nodes from these clock frequencies can be achieved by two basic methods: mutual synchronization and slave synchronization. In mutual synchronization, each node forms its own clock frequency from the mean value of the incoming signal frequencies and its current clock frequency. Hence, all nodes in the network drift towards a common mean frequency and in a steady state have reached said frequency. However, a network employing mutual synchronization cannot be synchronized with a desired source, and thus it will be difficult to interconnect different networks, as in that case the operating frequency of the entire network cannot be precisely determined in advance. In slave synchronization, on the other hand, all network nodes are synchronized with the clock frequency of the master node of the network. Each node selects one incoming signal frequency as the source for its clock frequency. The node seeks to select a signal having the clock frequency of the master node of the network.

In independent slave synchronization, each node makes its decisions about synchronization without receiving any external information to support the decision-making. When the nodes make their decisions on synchronization independently, each node must determine with which node it is synchronized. These determinations are often made in the form of a priority list, and thus the node selects from valid incoming signals the one having the highest priority, i.e. the one highest on the list, as its synchronization source. If this signal is lost or its quality deteriorates so that it is no longer acceptable as a synchronization source, the node selects from the list the signal having the next-highest priority. The priority list must be compiled in such a way that all nodes on the list are located between the node concerned and the master node of the network, and thus synchronization is distributed from the master node to the lower levels.

However, independent slave synchronization poses limitations to network synchronization: in looped networks, all links cannot be used for synchronization, and hence the dynamic adaptability of the network in different situations is limited. Communication must be present between the nodes in order for the information possessed by an individual node to be sufficient for decision-making in all situations without any need to strongly limit the number of links utilized for synchronization, in which case the clock frequency of the master node could not be distributed as easily to the network nodes. There are two methods for such communication, which will be described in the following.

A simple method for expanding independent slave synchronization to be communicative is loop protected synchronization (LP). LP synchronization seeks to prevent the timing from drifting into inoperative state in looped networks by using two state bits mcb and lcb as an aid in the above priority lists, the bits being transmitted between network nodes. The first state bit, the master control bit (mcb), indicates whether the synchronization is derived from the master network node. The master node defined for the network sends this bit as a logical zero in its outgoing signals, and the other nodes relay it further, if they are synchronized with a signal in which the mcb bit has the value zero. The other state bit, the loop control bit (lcb), indicates whether there is a loop in the synchronization. Each node in the network sends this bit as a logical one in the direction in which it is synchronized and as a logical zero in other directions.

Another way in which independent slave synchronization has been expand to be communicative is to use a synchronization status message (SSM) in accordance with the ITU-T standards G.704 and G.708. Standard G.704 defines the frame structure of a digital transmission system operating at a rate 2048 kbit/s. In accordance with the recommendation, bits 4–8 in every second frame are spare bits and may be used e.g. to transport the above synchronization status messages. Only one of bits 4–8 in a frame can be used for this purpose, and thus a four-bit synchronization status message is made up by a selected bit (4–8) in frames 1, 3, 5, and 7 and in frames 9, 11, 13, and 15 of the multiframe. The same synchronization status messages (SSM) are in standard G.708 for SDH networks. In an SDH network, the synchronization status messages are transported in bits b5 . . . b8 of byte S1 in the section overhead (SOH) of the STM-N frame.

The table below presents the synchronization quality levels (QL) indicated by the bit patterns formed by these selected bits San1–San4 (n=4, 5, 6, 7 or 8) S1 (b5 . . . b8). The last column shows the expressions in accordance with to the recommendations.

| QL | San1–San4 or S1 (b5 . . . b8) | Synchronization Quality (QL) Description |
|---|---|---|
| 0 | 0000 | Quality unknown (Existing Sync. Network) |
| 1 | 0001 | Reserved |
| 2 | 0010 | G.811 |

-continued

| QL | San1–San4 or S1 (b5 ... b8) | Synchronization Quality (QL) Description |
|---|---|---|
| 3 | 0011 | Reserved |
| 4 | 0100 | G.812 Transit |
| 5 | 0101 | Reserved |
| 6 | 0110 | Reserved |
| 7 | 0111 | Reserved |
| 8 | 1000 | G.812 Local |
| 9 | 1001 | Reserved |
| 10 | 1010 | Reserved |
| 11 | 1011 | Synchronization Equipment Timing Source (SETS) |
| 12 | 1100 | Reserved |
| 13 | 1101 | Reserved |
| 14 | 1110 | Reserved |
| 15 | 1111 | Do not use for Synchronization |

As will be seen from the table, ITU-T has decided on four synchronization levels, and additionally a meaning has been given to two further levels; one indicates that the synchronization level is unknown and the other that the signal should not be used for synchronization (QL=1111).

FIGS. 1 and 2 illustrate the operation of the SSM method in a ring-shaped network having five nodes in all, denoted by references N1 ... N5. Within each node, the quality level of the internal clock of the node (QL:1011) is indicated at the top of the column. Therebeneath the priority list of the node is shown, wherein the selected timing source is indicated in italics. As stated previously, each node selects as its timing source the signal having the highest quality level as indicated by the synchronization message included therein. If several signals have the same quality level, the one highest on the priority list is selected. The synchronization status message transmitted by each node is shown with reference "QL:xxxx" beside each port of the node. External timing sources S1 and S2 are connected to the master node N1 and to node N3 respectively. The quality levels of the synchronization status messages (QL=0010 and QL=0100) sent by the external sources are indicated above the sources. A QL value must be given to each source external of the loop synchronization.

FIG. 1 shows the network in a normal situation (no failures). The master node N1 utilizes an exterior timing source S1, which in this example has been defined to be a clock having the quality level QL=0010. The master node transmits this synchronization status message in both directions. Slave nodes are synchronized with the signal arriving from the port Pa from the main direction; the synchronization status message included in this signal is QL=0010. In this situation, they transmit the same quality level (QL=0010) forward through port Pb and send the quality level QL=1111 (do not use for synchronization) in the direction from which they are receiving their timing (in the direction of port Pa).

FIG. 2 shows a situation in which a failure condition has occurred on the connection between nodes N1 and N2. When node N2 detects this failure, it selects a new timing source. Since it is receiving the quality level QL=1111 from the other direction (from node N3), it cannot use this direction for timing either, and hence it changes to internal timing state and starts transmitting the quality level QL=1011 of its own clock. The next node (node N3) receives this quality level through port Pa, changing external source S2 for its timing source, as the quality level QL=0100 given by this source is higher than that received through port Pa and port Pb cannot be used for timing (QL=1111). Node N3 starts transmitting the quality level QL=0100 in both directions. Node N2 synchronizes itself with the signal arriving from node N3, as the quality level included in that signal is higher than the internal quality level (QL=1011) of node N2, and thus it starts transmitting the quality level QL=1111 in the direction of node N3. Also node N4 accepts the quality level transmitted by node N3, because it is receiving the quality level QL=1111 through port Pb. Hence, node N4 transmits the quality level QL=0100 to node N5, which is synchronized in the direction of port Pb, as the quality level QL=0010 is obtained therefrom. In that situation, node N5 returns the quality level QL=1111 to node N1 and transmits the quality level QL=0010 to node N4. The remaining nodes in the loop do the same, that is, transmit the quality level QL=0010 from port Pa and return the quality level QL=1111 to port Pb. Hence, the situation shown in FIG. 2 has been reached. The loop has thus been synchronized in its secondary direction.

As is apparent from the above examples, the synchronization status messages function well in chain-shaped and ring-shaped networks. On the other hand, in the case of complex network architectures (particularly mesh networks in which more than one path is provided between any two nodes) the synchronization status messages are not capable of preventing synchronization loops from being created. For this reason, the synchronization of complex networks is very difficult to implement in such a way that for example in failure situations no synchronization loops would be created causing the timing to drift towards inoperative state. The synchronization planning of networks has conventionally been carried out manually, which further adds to the possibility of errors.

Furthermore, when conventional planning is used, too long synchronization chains will easily be created in connection with complex networks, as a result of which synchronization sources will be slow to change in failure or altered situations. On account of delays and incorrect use of status messages, also unnecessary changes of synchronization source will easily take place in the network.

BRIEF DESCRIPTION OF THE INVENTION

It is an object of the present invention to eliminate the above drawbacks and to provide a method wherewith the synchronization network of a telecommunications network can be defined in a simple manner also in complex mesh networks. A synchronization network denotes a network through which the nodes are synchronized with the master clock frequency. In the logical sense, a synchronization network is a network superimposed on the actual telecommunications network, even though the synchronization network utilizes the same physical links as the actual telecommunications network.

The above object is achieved with the solution defined in the independent claim.

The idea of the invention is first to establish a basic synchronization network comprising all master clocks. The basic synchronization network is made up in accordance with certain predetermined criteria from the best synchronization chains between two different master clocks or one or more chains between two different master clocks, selected in an order of superiority, and chains leading to these chains from other master clocks. Thereafter, synchronization chains leading from other nodes to said basic synchronization network are connected to this basic network in a predetermined order of superiority until all nodes are included in the synchronization network. In the chains formed, the priorities of the nodes are defined in such a way that the node interface closest to the master clock receives first priority.

On account of the solution in accordance with the invention, the network can be systematically synchronized independently of the current topology of the network, so that creation of timing loops is prevented. Moreover, the planning can be automated as the solution offers methods independent of the network topology for implementing the synchronization.

Using the steps in accordance with the invention, the master clock can be distributed in the network along the best possible paths. If as a result of a failure connection with one or more master clocks is lost, the master clock signal is replaced by an intra-node clock source having as high a quality as possible. The synchronization chains can also be kept sufficiently short.

BRIEF DESCRIPTION OF THE FIGURES

In the following, the invention and its preferred embodiments will be described in closer detail with reference to FIGS. 3a . . . 5b in examples in accordance with the accompanying drawings, in which.

DETAILED DESCRIPTION OF THE INVENTION

In the following, the method of the invention will be described step by step with reference to the network shown in the accompanying FIG. 3a, having master clocks A, B and C and nodes D . . . M. The clocks having the best quality are denoted PRC (Primary Reference Clocks) and will be termed master clocks in the following. The master clocks have direct connection with nodes D, E and G (synchronization inputs of these nodes). The quality level of the internal clock of each node relative to the synchronization (QL=2 or QL=3) is indicated with a number within each node. The links between the nodes are denoted by broken lines.

The method of the invention can be subdivided into two parts. In the first part, a basic synchronization network is established, including all master clock sources. Thus, in the first step all master clocks are retrieved within the synchronization plan. In the second step, the remaining nodes are synchronized with this basic synchronization network by finding the best possible synchronization chains from the nodes to nodes already included in the basic network (i.e., nodes already synchronized).

First, the method finds from the network the clocks having the best quality. These clocks are stand-alone synchronization sources that do not receive their synchronization from the network. The clocks are only used for network synchronization, and the user determines their location in the network. The clocks are typically cesium clocks according to the standard G.811, or GPS (Global Positioning System) based synchronization sources. Said clocks may also be internal clocks of some nodes.

Figure 1:
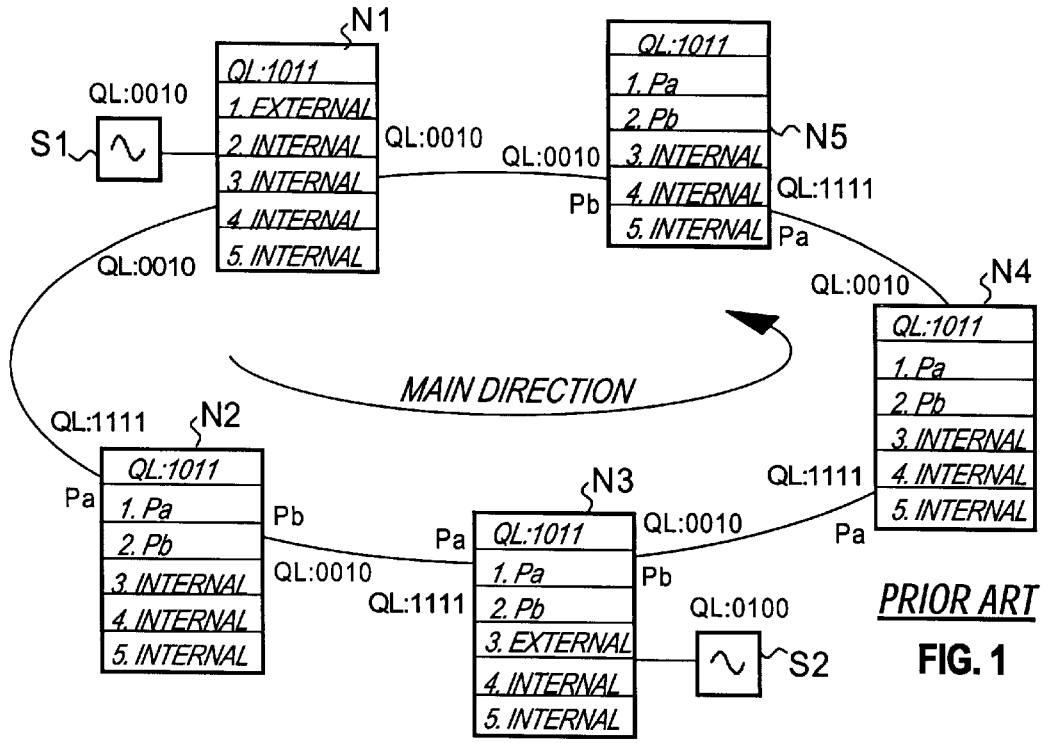
FIG. 1 shows a loop network utilizing synchronization status messages.
Figure 2:
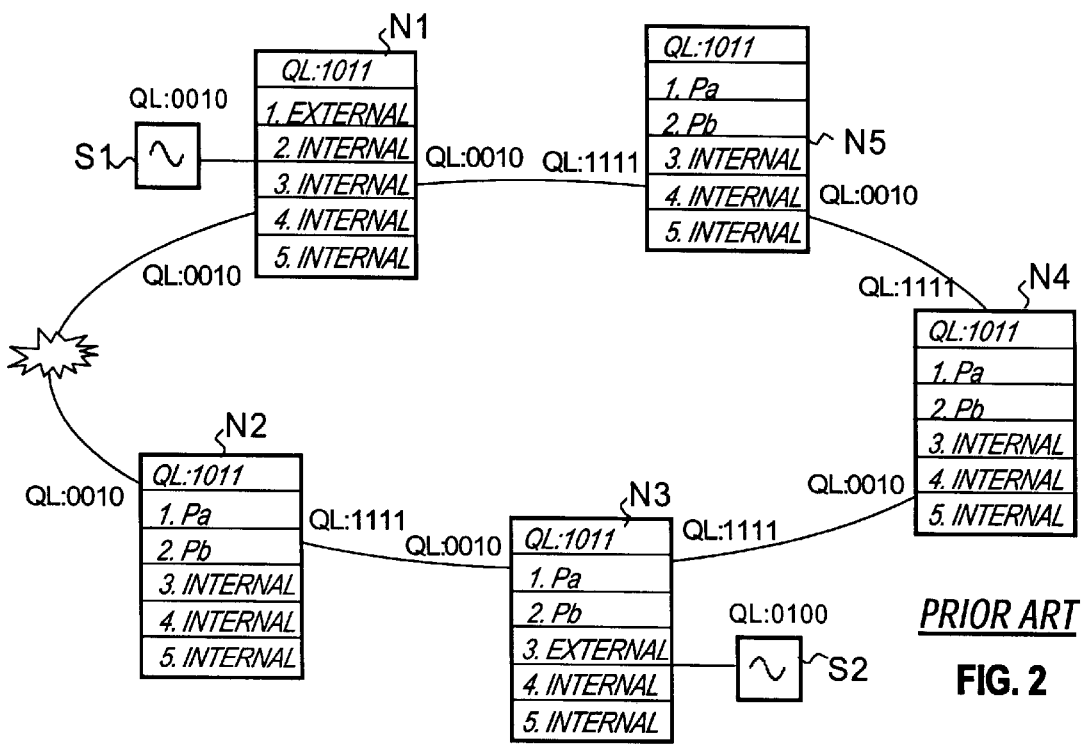
FIG. 2 shows the operation of FIG. 1 in a fault situation, FIGS. 3a . . . 3f illustrate the establishing of a synchronization network.
Figure 3A:
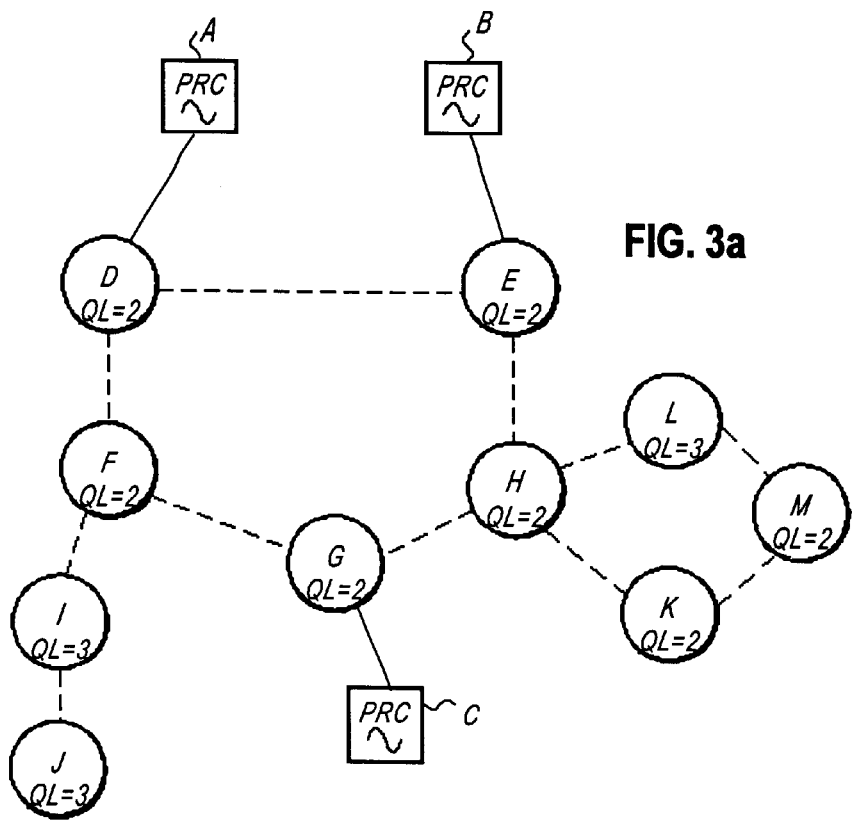

In the exemplary case of FIG. 3a, the above means that clocks A, B and C are localized in the network as having the best quality level.

When the clock sources having the best quality have been found, it is studied whether (synchronization) chains can be established between these clocks through the links between the nodes.

If this is the case, all combinations of two master clocks are studied and all possible chains for each combination are sought. In the exemplary network of FIG. 3a, this means that as a first step, all chains between clocks A and B are sought, thereafter all chains between clocks A and C, and lastly all chains between clocks B and C. Two chains are obtained between clocks A and B. These are chain A→D→E→B and chain A→D→F→G→H→E→B. Chain A→D→F→G→C and chain A→D→E→H→G→C can be established between clocks A and C. Chain B→E→H→G→C and chain B→E→D→F→G→C are obtained between clocks B and C.

An identifier is calculated in a predetermined manner for each chain that has been found. When all identifiers have been calculated, the chain having the best identifier is selected. This chain forms the first part of the synchronization network. The selection criteria employed may vary and may include for example the length of the chain or the quality of the clocks in the nodes in the chain, or a combination of these two factors in which each factor is weighted in the desired manner. For example, the sum of the quality levels of the node clocks can be calculated for the chain and the chain having the best (smallest) sum is selected. In this first part of the synchronization network, the priorities of the node interfaces are calculated in such a way that in each node the interface wherefrom the distance to the master clock is the shortest (having the smallest number of links) will receive first priority. Since a chain is concerned here, the second interface of the node receives the second priority.

In the example of FIG. 3a, the above means that the chain A→D→E→B between clocks A and B will be selected as the first part of the synchronization network. When the priorities are defined in accordance with the foregoing, the situation of FIG. 3b will be reached, wherein node D is synchronized with master clock A and node E with master clock B. The synchronization network thus formed is denoted by continuous lines, the distribution of the master signal by arrows, and the priorities of the interfaces by numbers (1 and 2) beside them.

Thereafter it is studied whether there are still master clocks that are not included in the synchronization network. If this is the case, all possible chains from master clocks that are not yet part of the synchronization network to nodes already included in the synchronization network are sought.

Figure 3B:
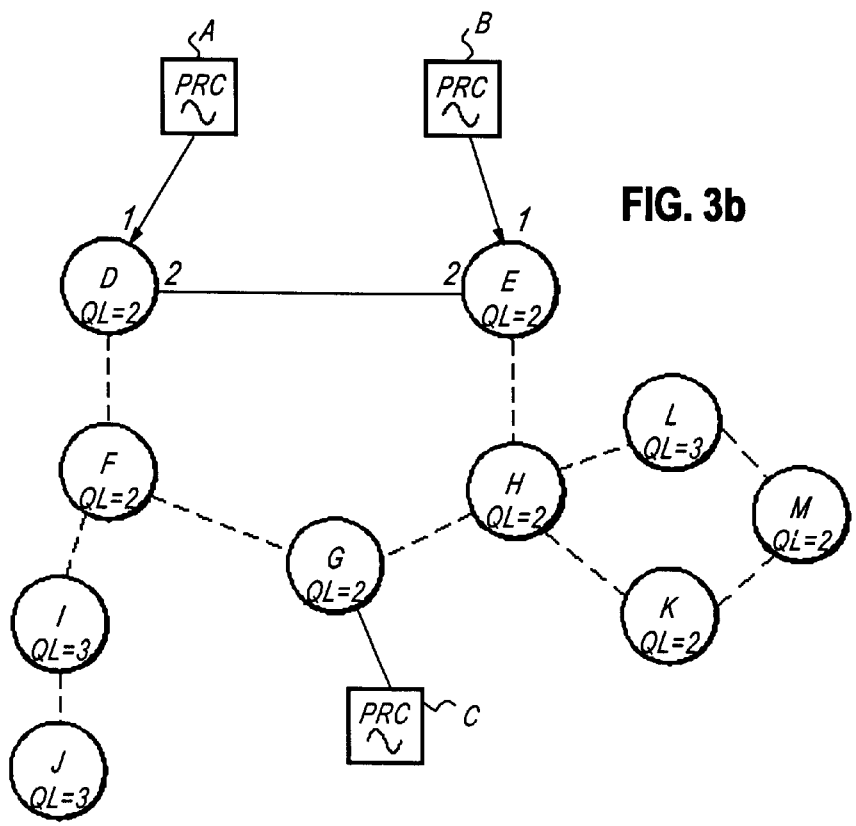

In the exemplary situation shown in FIG. 3b, it is found that master clock C is not yet a part of the synchronization network. Hence, all chains from master clock C to the synchronization network (to nodes D and E) are sought. In this case, there are two such chains (C→G→H→E and C→G→F→D); these chains have identifiers of equal value and thus any one of them may be selected. In the example shown in the figures, the chain C→G→H→E has been selected. Thus, as a next step this chain is included in the synchronization network by assigning priorities to the network nodes in accordance with the above principle. This gives the situation of FIG. 3c, in which all master clocks and nodes D, E, H and G are included in the synchronization network. For node H, any one of the two interfaces may be selected as first priority, since each is equally close to the master clock and the intervening node has the same quality level. In this example, node H is synchronized with node G.

When all master nodes are connected as part of the synchronization network in the above manner, the remaining nodes can be dealt with. This is done by selecting from the network a synchronization source (node) that is the next in quality, is not part of the synchronization network, and has as a neighbour a node that is already part of the synchronization network.

Starting from the selected node, all paths (chains) to nodes that are already part of the synchronization network are sought, except for the neighbouring node to the selected node which is already included in the synchronization network. An identifier is calculated for all chains in the above manner. The chain having the best identifier is included as a part of the synchronization network by defining the priorities in said chain in the above manner.

If no chain from the selected node to another synchronization source is found, it is checked whether a loop from said neighbouring node through the selected node back to that neighbouring node can be established via nodes not yet included in the synchronization network. All such loops are sought, and the loop having the best identifier is selected. The loop is synchronized with said neighbouring node, assigning priorities to the nodes in the loop in accordance with the above principle. If it is not possible to establish a loop, the node is synchronized from the neighbouring synchronization link (interface closest to the master clock).

Figure 3C:
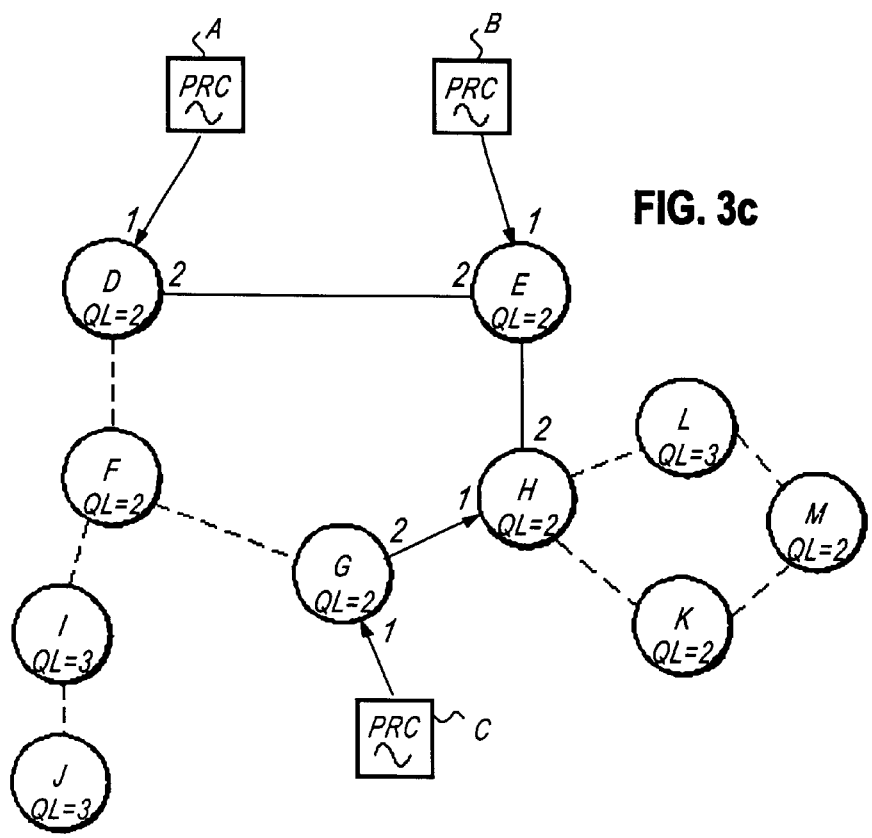
Figure 3D:
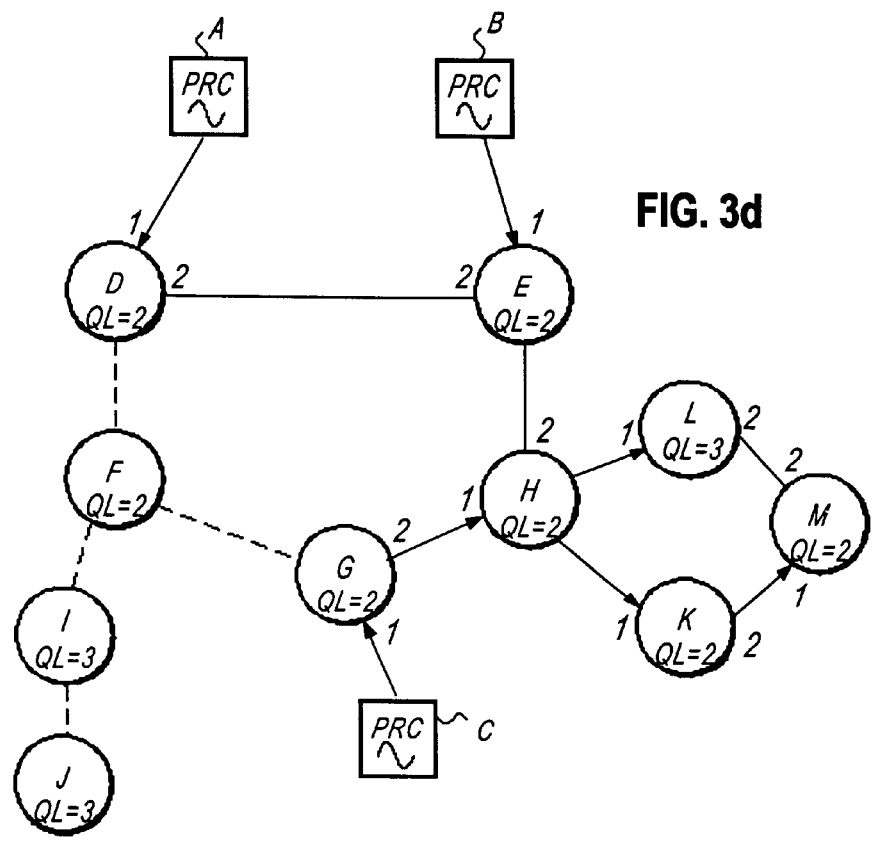

In the exemplary situation shown in FIG. 3c, the above means that either node F or node K may be selected, as they have the same quality level and both have as a neighbour an already synchronized node (already being part of the synchronization network). In the present example, node K is selected. In this situation, it is found that no chain can be established from node K to a node that is already included in the synchronization network but is not a neighbour to node K. Thereafter it is checked whether a loop can be established from node H through node K back to node H via nodes that are unsynchronized as yet. It is found that a loop will be created via nodes K, L and M. The loop is synchronized from node H, and priorities are assigned to the nodes in the loop in accordance with the above principle. Thus the situation of FIG. 3d is reached. For node M, synchronization through node K is selected, as node K has a higher quality level than node L.

Thereafter, a synchronization source (node) is selected from the network that has the next-highest quality level and is not yet part of the synchronization network, and the above steps are carried out for that node. Selection is continued until all nodes are included in the synchronization network.

Figure 3E:
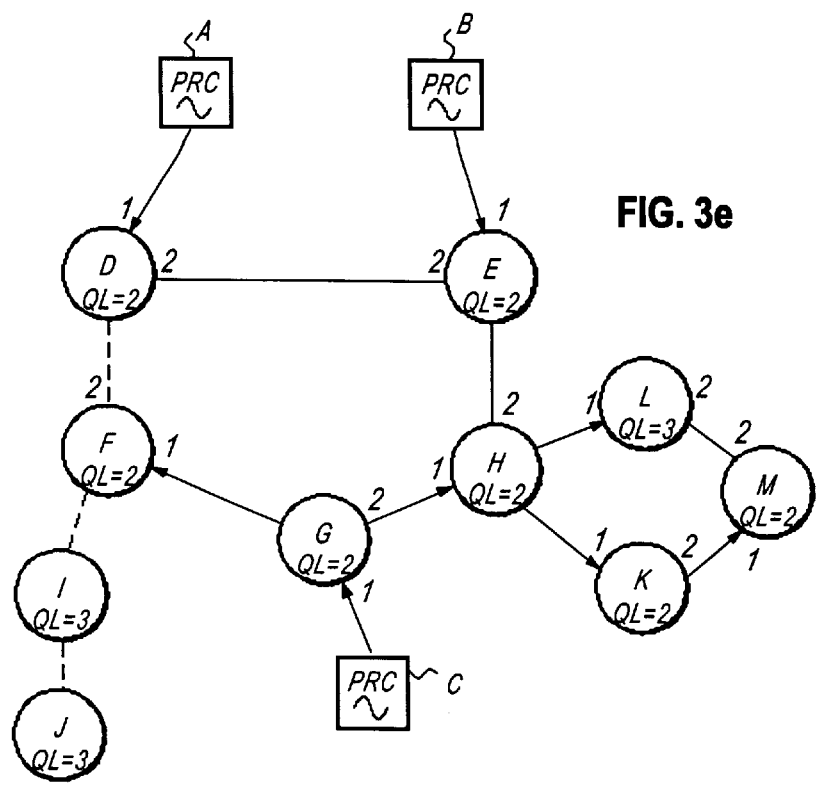

In the exemplary situation of FIG. 3d, this means that hereafter only node F can be selected. No chain is found from this node to the already existing synchronization network, and no loop back to the node can be created in the above manner. Thus the node is synchronized from the neighbouring synchronization link, which in this example is the link to node G. This gives the situation of FIG. 3e.

Figure 3F:
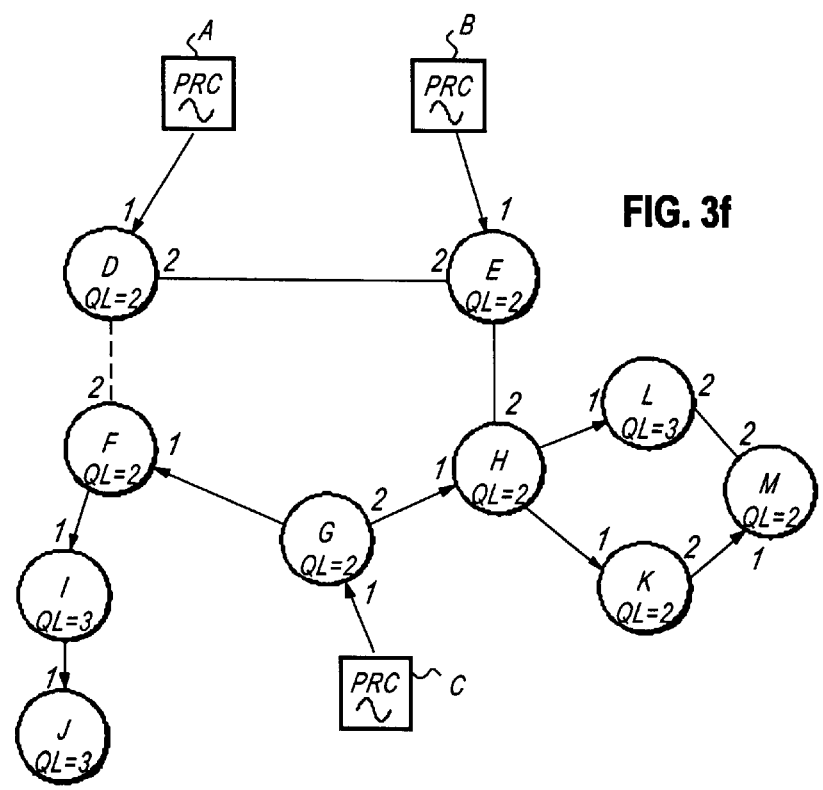

Thereafter, only node I can be selected on the basis of the above rules. Since there is no established chain to the synchronization network, nor a loop, the node can only be synchronized from the link to node F. After this, only node J can be selected; this node is synchronized on the same basis from the link to node I. This gives the synchronization network of FIG. 3f. Since the last chain leads nowhere, no second priority is assigned.

Figure 4A:
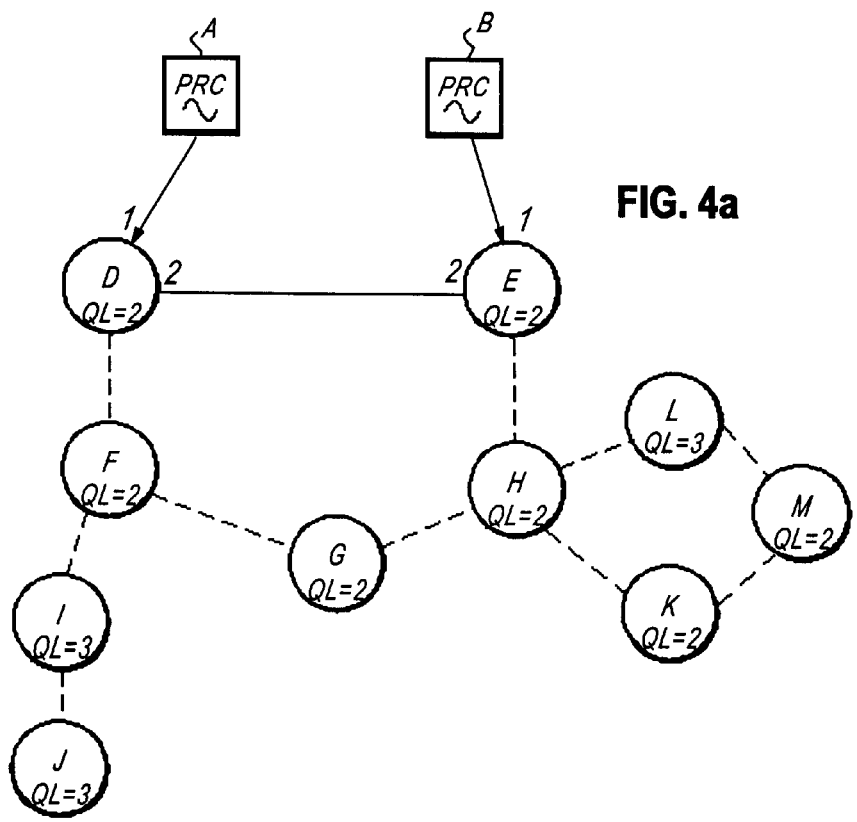
FIGS. 4a and 4b illustrate situations corresponding to those of FIGS. 3b and 3c when the network has one master clock less.
Figure 4B:
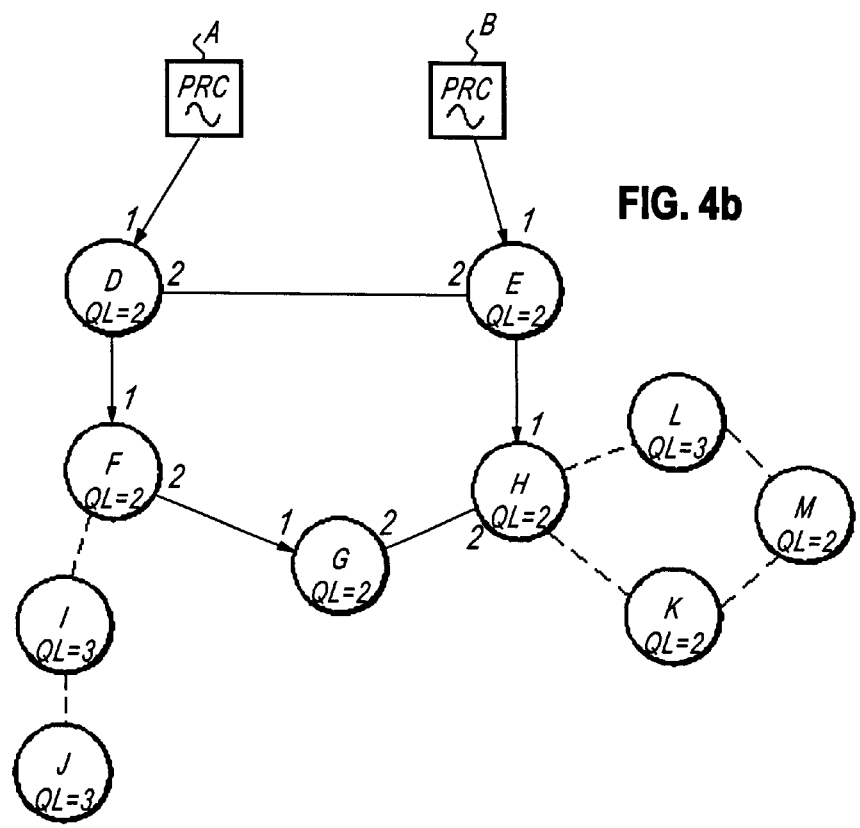

FIGS. 4a and 4b illustrate the same network as FIGS. 3a . . . 3f, except that in this case there is no master clock C. When the establishment of the synchronization network reaches a stage wherein all master clocks are included in the synchronization network, the situation will be as shown in FIG. 4a. Thereafter, the best neighbouring node to the synchronization network already formed is sought. In the exemplary case, either node H or node F can be selected, as these have the same quality level. If node H is selected, all chains from node H to the already existing synchronization network are sought. In this case, only one chain (H→G→F→D) is found, and thus as a next step said chain is included in the synchronization network shown in FIG. 4a. This gives the situation shown in FIG. 4b.

The master clocks may be retrieved within the synchronization plan in many different ways. For example, all combinations of two different master clocks need not necessarily be studied, but two master clocks may be directly selected, for instance, and the best possible chain between these is calculated. The first part of the synchronization network is immediately formed by this chain. Hence the optimization need not necessarily be brought to completion.

Figure 5A:
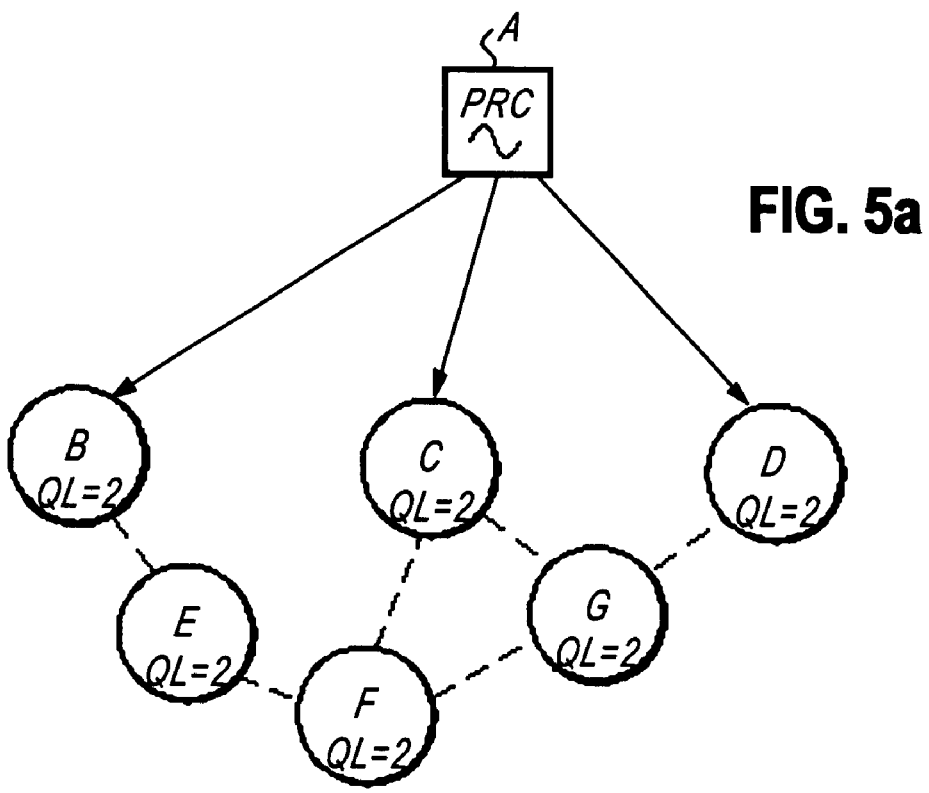
FIGS. 5a and 5b illustrate implementing of synchronization in a network having only one master clock.
Figure 5B:
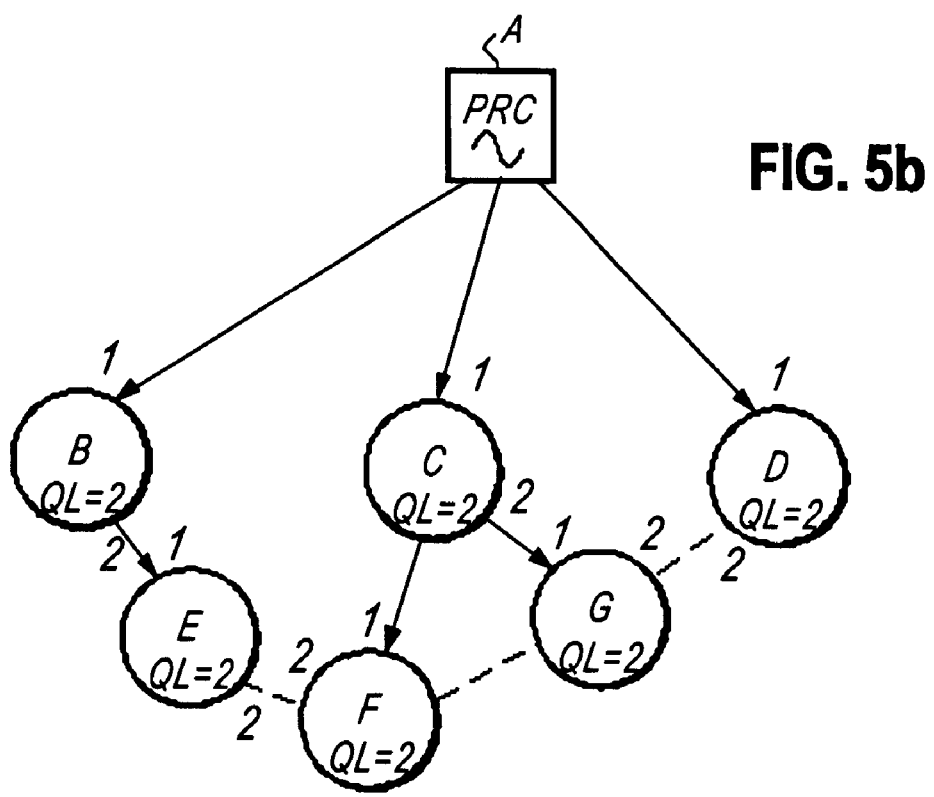

If there is only one clock source having the best quality, no chains can be established between the master clocks. In such a case, it is studied whether there is a connection from the master clock to more than one node or to one node only. If there are more than one connection, the first two nodes connected to the master clock are selected and the best chain between them is sought. All combinations of two different nodes are considered, identifiers for the chains are calculated, and the chain having the best identifier is selected. For example in the case of FIG. 5a, nodes B and C could first be selected. Two chains (B→E→F→C and B→E→F→G→C) can be established between them. Thereafter the chains between nodes B and D and lastly the chains between nodes C and D are sought. The best chain in this exemplary case turns out to be the chain between nodes C and D (C→G→D). Hence, in the first step nodes B, C, D and G are included in the synchronization network. Thereafter the method proceeds in the above manner, finding the best neighbouring node to the already established synchronization network. In that case, either one of nodes E and F may be selected, as they have the same quality level. If node F is selected, it is found that a chain is obtained therefrom to node B. Thus in this example the synchronization network of FIG. 5b is obtained. Since there are no endless chains in the network (as the chain formed by nodes I and J in FIG. 3f), a second priority has also been assigned to all nodes.

If there is a connection from the master node to one node only, one or more of these connections are used to synchronize that node.

Even though the invention has been explained in the above with reference to the examples in accordance with the accompanying drawings, it is obvious that the invention is not to be so restricted, but it may be modified within the scope of the inventive idea set out above and in the appended claims. The master nodes (nodes having a master clock or nodes directly connected to a master clock) have no priority list. The priority list may also comprise one interface only. In other words, all nodes need not send synchronization status messages via all their interfaces. For example in lower-level chains (that receive their timing from higher-level chains) the status messages may be disabled in order for the short-term changes in the master clock quality taking place on the higher level not to cause unnecessary changes in the synchronization of the lower-level chains. For instance, in the network of FIG. 4b the use of status messages could be disabled in node F in the direction of node D and in node H in the direction of node E, to prevent the effects of short-term changes from the directions of the master clocks on that part of the network which is below nodes F and H in the synchronization hierarchy.

The first part of the synchronization network may also be established in such a way that the best chain between two selected master clocks is first selected, thereafter the best chain using another master clock combination, etc. This may be continued until all master clocks are included in the synchronization network, or addition of chains including one master clock to the synchronization network thus formed may be started at a desired stage. In each chain to be added to the synchronization network, the first priority of the node is determined in the above manner.

What is claimed is:

1. A method for creating a synchronization network for a telecommunications network, the method comprising:

interconnecting a plurality of nodes with links, sending, when a network is operational, a synchronization status messages indicating a quality level of a corresponding signal relative to the synchronization of the network, wherein the quality levels indicate signals not allowed to be used for synchronization, using at least one master clock as a synchronization source for network nodes, establishing a synchronization network by selecting, in accordance with a topology defined by the links, synchronization chains formed by successive nodes and by defining for different nodes in the chain a node-specific priority list including node interfaces at different priority levels, determining the synchronization source to be selected by a node when signals of equal quality levels are received on the node interfaces, defining a desired number of clock sources having the highest possible quality level as the master clocks of the network, selecting at least one node chain between two different master clocks as a first part of the synchronization network in accordance with predetermined criteria, if there are remaining master clocks not included in the synchronization network after the selection, selecting node chains not included in the first part and including each remaining master clock into the synchronization network in a predetermined order of superiority until all master clocks have been selected into the chains, selecting chains leading from nodes not included in the already selected chains that include the master clocks, are added into the synchronization network in a predetermined order of superiority, and defining, in each chain selected into the synchronization network, the priorities for the node interfaces, wherein the node interface closest to the master clock will receive first priority.

2. The method as claimed in claim 1, wherein establishing the synchronization network further comprising:

(a) searching, through the links of the telecommunications network, for all chains that are formed between two different master clocks, and if at least one chain is found, (b) determining an identifier for each chain in accordance with predetermined criteria, (c) selecting the chain having the best identifier as the first part of the synchronization network, and the priorities for the interfaces of the chain nodes are determined, wherein the node interface closest to the master clock will receive first priority, (d) selecting, from among master clocks not yet included in the synchronization network, one master clock, and searching for all chains ending with a node in said first part starting from said master clock through the links of the telecommunications network, (e) defining an identifier in accordance with predetermined criteria for each chain found, (f) selecting and connecting the chain having the best identifier as a part of the already established synchronization network by defining the priorities of the interfaces for the chain nodes in such a way that the interface closest to the master clock will receive first priority, (g) repeating steps (d) . . . (f) until all master clocks are included in the synchronization network, (h) selecting a neighbouring node having a clock source of the best possible quality from among the neighbours to the already established synchronization network that are not yet synchronized, (i) starting from the selected neighbouring node, all chains ending with a node of the already existing synchronization network that is not a neighbour to the selected neighbouring node are sought, and an identifier is determined in accordance with predetermined criteria for each chain found, (j) selecting, from the chains that have been found, the chain having the best identifier and that chain is included as a part of the synchronization network by defining the priorities of the interfaces of the chain nodes in such a way that the node interface closest to the master clock will receive first priority, and (k) repeating steps (h)–(j) until all nodes of the telecommunications network are included in the synchronization network.

3. The method as claimed in claim 2, wherein searching, through the links of the telecommunications network for all chains that are formed between two different master clocks, is carried out for all possible master clock combinations.

4. The method as claimed in claim 2, wherein the identifier is determined on the basis of the number of nodes in the chain.

5. The method as claimed in claim 2, wherein the identifier is determined on the basis of the quality levels of the internal clocks in the chain nodes.

6. The method as claimed in claim 2, wherein the identifier is determined on the basis of both the number of nodes in the chain and the quality levels of the internal clocks of the chain nodes.

7. The method as claimed in claim 2, wherein if no chain is found in step (j), determining whether a loop can be established from said neighbouring node already included in the synchronization network through the selected neighbouring node via the telecommunications network links back to said neighbouring node already included in the synchronization network, in which case if a loop is found, the loop is synchronized from the neighbouring node already included in the synchronization network, and if no loop is found the selected neighbouring node is synchronized from the neighbouring synchronization link.

8. The method as claimed in claim 2, wherein if no chains are found in step (b), determining whether there is a connection from the master clock to more than one node, and if a connection exists, searching all chains established between two such nodes through the links of the telecommunications network, wherein after steps (c) and (d) have been performed the method proceeds directly to step (i).

9. The method as claimed in claim 1, wherein in some of the nodes the synchronization status messages are disabled to prevent the changes in the synchronization network from affecting the network part located below said nodes in the synchronization hierarchy.

* * * * *